Feb. 12, 1924.  1,483,582

G. JACOBS

PISTON RING

Filed Aug. 1, 1922

Inventor.
Grant Jacobs.
by Orwig & Hague Att'ys.

Patented Feb. 12, 1924.

1,483,582

UNITED STATES PATENT OFFICE.

GRANT JACOBS, OF DES MOINES, IOWA.

PISTON RING.

Application filed August 1, 1922. Serial No. 578,943.

*To all whom it may concern:*

Be it known that I, GRANT JACOBS, a citizen of the United States, and a resident of Des Moines, in the county of Polk, State of Iowa, have invented a certain new and useful Piston Ring, of which the following is a specification.

The object of my invention is to provide a piston ring of simple, durable and inexpensive construction which will automatically and quickly adapt itself to accurately fit the contour of the interior of a cylinder, even though the interior of the cylinder is not perfectly round, and which will not be affected by variations in temperature to as great an extent as are the ordinary metal piston rings.

A further object is to provide a piston ring of this class which will maintain a neat, tight joint with the interior of the cylinder after a long period of use.

My invention consists in the construction, arrangement and combination of the various parts of the device, whereby the objects contemplated are attained, as hereinafter more fully set forth, pointed out in my claims, and illustrated in the accompanying drawings, in which:

Figure 1:
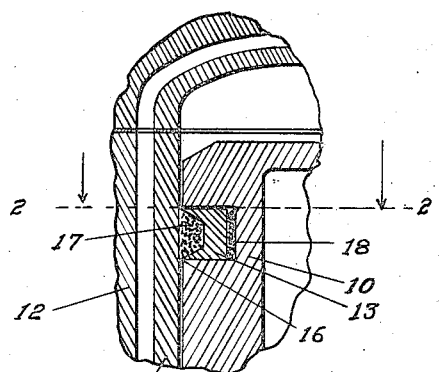
Figure 1 shows an enlarged, detail, sectional view illustrating a part of a piston and a part of a cylinder having my improved piston ring applied thereto.
Figure 3:
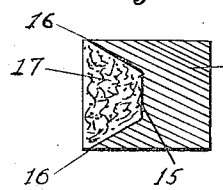
Figure 3 shows an enlarged, transverse, sectional view through the piston ring.
Figure 2:
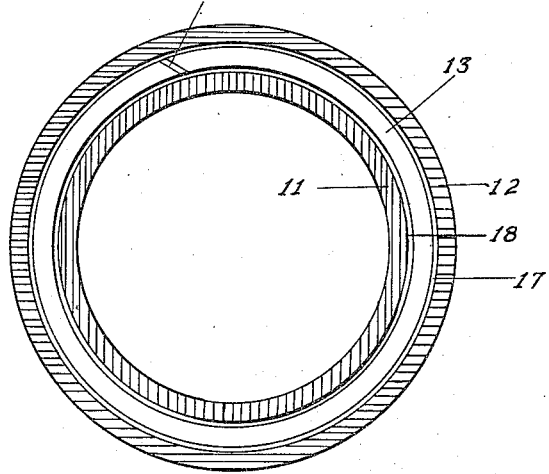
Figure 2 shows a horizontal, sectional view on the line 2—2 of Figure 1, showing a cylinder and piston ring and my improved packing ring in position therein.

Referring to the accompanying drawings, I have used the reference numeral 10 to indicate a piston of the ordinary construction having an annular groove in its exterior to receive a piston ring. 11 indicates a cylinder for an internal combustion engine or the like, also of ordinary construction, and 12 a water jacket for the cylinder.

My improved piston ring comprises a body portion indicated by the numeral 13 and made of metal of the same kind of piston rings now in general use. At one side the metal is split at 14 in the ordinary manner to allow for contraction and expansion, and to permit it to be sprung into the groove in the piston.

The top, bottom and inner faces of the piston ring body are flat in cross section, as shown in Figure 1, and in the outer face thereof there is an annular groove 15, the sides of which diverge toward the outer edge of the outer face of the ring, and these divergent sides of the groove extend to a point intersecting with the top and bottom surfaces of the piston ring, forming sharp edges 16.

Mounted within the annular groove 15 is a packing ring 17 which is preferably made of asbestus fiber or other heat-resisting fibrous flexible material, and this asbestus ring 17 is shaped to fit the groove 15, and when first applied it projects outwardly slightly beyond the sharp edges 16, as shown in Figure 1. This packing extends continuously all around the piston ring past the split portion thereof.

In the space between the inner face of the piston ring and the bottom of the piston ring groove I provide an annular strip 18 preferably of asbestus or other heat-resisting flexible material. This strip 18 does not completely fill the space between the packing ring and the piston groove, as shown in Figure 1, so that the piston ring may expand or contract to a limited extent, and during such movement the strip 18 will be flattened out to more or less completely fill the space.

In practical operation, and assuming that the piston ring is assembled in a piston and cylinder, as shown, then when there is a pressure of gas between the piston head and the cylinder head, pressure will be applied to the top edge of the strip 18 tending to force it downwardly in the space between the inner face of the piston ring body 13 and the bottom of the piston ring groove, and also tends to force the piston ring outwardly and this material being relatively soft and pliable will adapt itself to irregularities in the adjacent portions of the metal and make a practically leak tight joint.

The asbestus packing ring 17 is intended to normally stand in close contact with the interior of the cylinder and to prevent leakage of gas between the cylinder and the piston ring.

I have found in practice that the slight amount of expansion and contraction of metal piston ring bodies will not operate to in any way injure the asbestus piston ring 17 at the point where the latter passes the split in the metal piston ring, so that leakage is prevented at the point where the metal piston ring is split.

The advantage of having the outer edges of the metal piston ring formed with sharp edges is that in the event that if the asbestus packing ring has become worn or is tightly compressed, and in the event that the edges of the metal piston ring should then touch the cylinder, these sharp edges of the relatively soft metal of which the piston ring body is formed will soon be worn away or bent over by contact with the cylinder, thus throwing the asbestus ring again into contact with the interior of the cylinder.

I have found in practice that after the asbestus ring has once become fitted to the interior of the cylinder after a short period of use and has been subjected to the action of heat and oils, it will wear for a much greater period of time without decreasing in size than will a metal piston ring of the material ordinarily employed. Hence, when the conditions arise that both the asbestus ring and the sharp edges 16 engage the cylinder, these sharp edges will soon wear away and again expose the asbestus ring 17 to contact with the interior of the cylinder.

I claim as my invention:

1. An improved piston ring comprising a body portion made of spring metal and split, said body portion being formed with an annular groove in its outer surface, and a second ring formed of heat resisting, fibrous, flexible material mounted in said annular groove and formed into a complete circle extended across the split portion of the metal piston ring body, for the purposes stated.

2. An improved piston ring comprising a body portion made of spring metal and split and formed on its outer surface with an annular groove, the material of which the metal ring is formed on the opposite sides of the annular groove being tapered from a maximum thickness at the base of the groove to a relatively thin edge at the outer side of the piston ring, and a second ring formed of asbestus fiber in flexible condition mounted in said groove and extended completely around the piston ring, the material of which the metal ring is made being relatively soft so that in use and in the event that the asbestus fiber becomes worn sufficiently to permit contact of the thin edges of the metal piston ring with the interior of the cylinder, these thin edges will wear rapidly so that contact will be maintained between the asbestus packing ring and the interior of the cylinder.

Des Moines, Iowa, July 18, 1922.

GRANT JACOBS.